US012734701B2

(12) United States Patent
Hao

(10) Patent No.: US 12,734,701 B2
(45) Date of Patent: Sep. 15, 2026

(54) ROBOT MOTION CONTROL METHOD

(71) Applicant: BEIJING GEEKPLUS TECHNOLOGY CO., LTD., Beijing (CN)

(72) Inventor: Yuefan Hao, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/864,725

(22) PCT Filed: May 18, 2023

(86) PCT No.: PCT/CN2023/095050
§ 371 (c)(1),
(2) Date: Nov. 11, 2024

(87) PCT Pub. No.: WO2024/001596
PCT Pub. Date: Jan. 4, 2024

(65) Prior Publication Data

US 2025/0312922 A1 Oct. 9, 2025

(30) Foreign Application Priority Data

Jun. 30, 2022 (CN) ........................ 202210762032.X

(51) Int. Cl.
*B25J 9/16* (2006.01)
*B25J 19/02* (2006.01)
*G05D 1/243* (2024.01)

(52) U.S. Cl.
CPC ........... *B25J 9/1697* (2013.01); *B25J 9/1664* (2013.01); *B25J 19/023* (2013.01); *G05D 1/243* (2024.01)

(58) Field of Classification Search
CPC . B25J 9/16; B25J 9/1664; B25J 9/1697; B25J 19/023; G05D 1/242; G05D 1/243;
(Continued)

(56) References Cited

U.S. PATENT DOCUMENTS

2014/0104437 A1* 4/2014 Chao .................... G01C 21/005 348/E17.002
2014/0198227 A1* 7/2014 Mohammad Mirzaei .................. G06V 10/242 348/208.2

(Continued)

FOREIGN PATENT DOCUMENTS

CN 1569558 1/2005
CN 104077809 10/2014

(Continued)

OTHER PUBLICATIONS

EPO, Extended European Search Report for EP Application No. 23829782.4, May 16, 2025.

(Continued)

*Primary Examiner* — Dale Moyer
(74) *Attorney, Agent, or Firm* — Hodgson Russ LLP

(57) ABSTRACT

A method for controlling motion of a robot includes: obtaining a moving scene image collected by a visual sensor, and detecting a target reference object according to the moving scene image to obtain a detection result of the target reference object, wherein the target reference object comprises reference objects at two sides of a moving track of a target robot; determining an edge line of the moving track according to the detection result of the target reference object; determining positioning information of a target shadow eliminating point according to the edge line; and determining a motion adjustment parameter of the target robot according to the positioning information, and adjusting a
(Continued)

motion state of the target robot according to the motion adjustment parameter.

18 Claims, 4 Drawing Sheets

(58) Field of Classification Search
CPC ............... G05D 1/646; G05D 2105/28; G05D 2107/70; G05D 2109/10; G05D 2111/10; G05D 2111/17
See application file for complete search history.

(56) References Cited

U.S. PATENT DOCUMENTS

| | | | | |
|---|---|---|---|---|
| 2019/0310652 | A1* | 10/2019 | Cao | G05D 1/0268 |
| 2020/0282566 | A1* | 9/2020 | Yi | B25J 9/161 |
| 2021/0216079 | A1* | 7/2021 | Park | G05D 1/0238 |

FOREIGN PATENT DOCUMENTS

| | | |
|---|---|---|
| CN | 107424161 | 12/2017 |
| CN | 109341692 | 2/2019 |
| JP | H01133183 | 5/1989 |
| KR | 20180040314 | 4/2018 |
| KR | 101991626 | 6/2019 |
| KR | 20210069816 | 6/2021 |

OTHER PUBLICATIONS

WIPO, International Search Report and Written Opinion for PCT/CN2023/095050, Aug. 18, 2023.

CNIPA, First Office Action for CN Application No. 202210762032.X, May 1, 2026.

* cited by examiner

ROBOT MOTION CONTROL METHOD

CROSS-REFERENCE TO RELATED APPLICATIONS

This application is a U.S. national phase under 35 U.S.C. § 371 of International Patent Application No. PCT/CN2023/095050, filed on May 18, 2023, which claims priority to Chinese Patent Application No. 202210762032.X, filed on Jun. 30, 2022, the entire disclosures of which are hereby incorporated herein by reference.

FIELD

Embodiments of the present disclosure relate to the field of robot visual navigation technology, and more particularly, to a method for controlling motion of a robot.

BACKGROUND

With the development of the industrial automation, the robot technology has been rapidly developed and played an increasingly important role in the industrial production, and thus is widely used to complete work of high repeatability, high risk and high precision. A robot is expected to provide a better service and even replace humans to perform a wide variety of tasks, which requires the robot not only has an ability to complete tasks, but also has an ability to go to a task site as required, referred as the navigation technology for the robot.

Common navigation modes of the robot include radar navigation, inertial navigation, satellite navigation and visual navigation. In these navigation modes, the radar navigation is not widely used due to the cost factor, and it is difficult for the inertial navigation and the satellite navigation to serve in a scene with high accuracy requirements due to the accuracy factor. The visual navigation has become the most widely used robot navigation in various scenes because of its low implementation cost, high navigation flexibility and sufficient navigation accuracy.

In the related art, in an implementation process of the visual navigation, the robot determines a running path by identifying an identification code on the ground to determine a running direction of the robot. However, there will be production cost in a process of arrangement of the identification code on the ground, and the arrangement of the identification code has a strict arrangement standard, so it needs to provide investment in manpower and material resources to meet the arrangement standard. Finally, after the arrangement of the identification code is completed, it further needs to maintain the identification code regularly to avoid a situation that the identification code is worn out and aged, and cannot be recognized by the robot. Therefore, there is a need for a solution to the above problems encountered in the visual navigation of the robot.

SUMMARY

According to a first aspect of embodiments of the present disclosure, there is provided the method for controlling the motion of the robot, including: obtaining a moving scene image collected by a visual sensor, and detecting a target reference object according to the moving scene image to obtain a detection result of the target reference object, where the target reference object includes reference objects at two sides of a moving track of a target robot; determining an edge line of the moving track according to the detection result of the target reference object; determining positioning information of a target shadow eliminating point according to the edge line; and determining a motion adjustment parameter of the target robot according to the positioning information, and adjusting a motion state of the target robot according to the motion adjustment parameter.

According to a second aspect of embodiments of the present disclosure, there is provided a computing device, including: a memory, and a processor; where the memory is configured to store computer-executable instructions, and the processor is configured to execute the computer-executable instructions that, when executed by the processor, execute steps of any one of the methods for controlling the motion of the robot.

According to a third aspect of embodiments of the present disclosure, there is provided a non-transitory computer-readable storage medium storing computer-executable instructions that, when executed by a processor, execute steps of any one of the methods for controlling the motion of the robot.

DETAILED DESCRIPTION

Figure 1A:
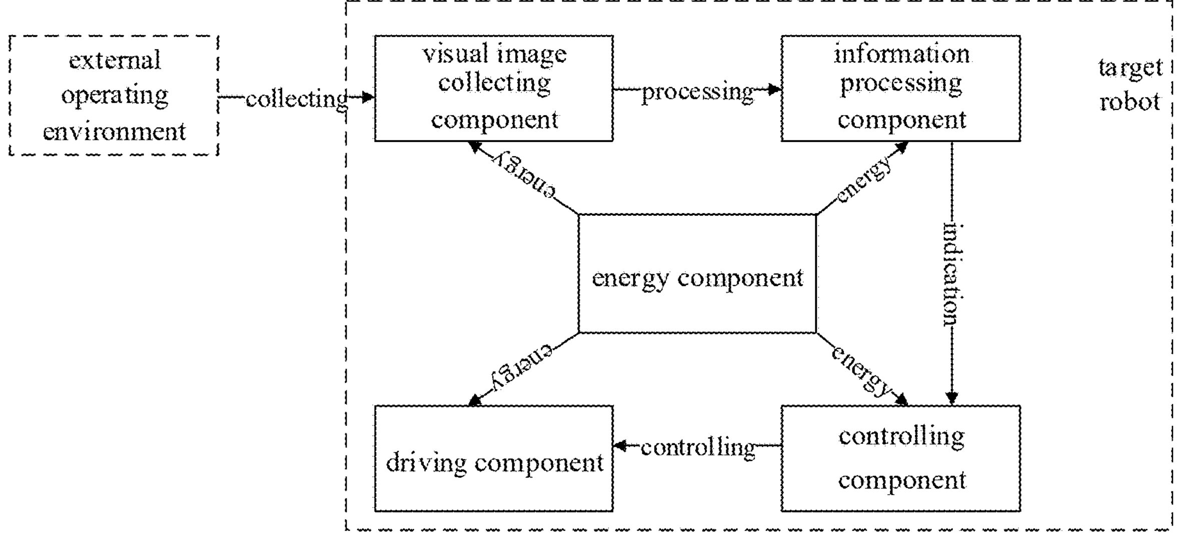
FIG. 1A is a block diagram illustrating a target robot in a method for controlling motion of a robot according to an embodiment of the present disclosure.

In the following description, numerous specific details are set forth in order to provide a thorough understanding of the present disclosure. While the present disclosure may be embodied in many different forms other than those described herein, those skilled in the art may make similar expansions without departing from the meaning of the present disclosure, so that the present disclosure is not limited to the specific embodiments disclosed below.

The terminology used in one or more embodiments of the present disclosure is for the purpose of describing exemplary examples only and is not intended to limit one or more embodiments of the present disclosure. As used in one or more embodiments of the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It should be understood that terms such as "first" and "second" may be used in one or more embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of one or more embodiments of the present disclosure. As used herein, the term "if" may be construed to mean "when" or "upon" or "in response to determining" depending on the context.

Firstly, terminologies in one or more embodiments of the present disclosure are explained.

Shadow Eliminating Point

Parallel lines in a three-dimensional scene do not intersect, or the parallel lines intersect at an infinity point (i.e., an infinitely distant point). When the parallel lines are projected onto a two-dimensional plane, the intersection infinity point is visible, and in this case, the infinity point is a shadow eliminating point.

Internal Reference Matrix

Different depth cameras have different feature parameters. In the computer vision, this set of parameters is the internal reference matrix of the camera.

In the present disclosure, a method for controlling motion of a robot is provided, and the present disclosure further relates to an apparatus for controlling the motion of the robot, a computing device, and a computer-readable storage medium, which are described in detail in the following embodiments.

In practical application, the motion of the robot is controlled by visual navigation, and the motion of the robot is guided by arranging an identification code on a moving track of the robot. Specifically, the robot collects an environment image via a visual sensor, then scans the environment image, identifies the identification code therein, determines whether a moving direction of the robot complies with a preset running track regulation according to a position where the identification code is arranged, and adjusts the moving direction according to the determination result.

However, in order to enable the robot to distinguish the identification code contained in the collected environment image, the identification code will be designed and manufactured in a specific pattern, so that the identification code has a visual characteristic which is different from irrelevant things in an operating environment of the robot, and may be distinguished from the environment by the robot. Furthermore, the identification code is arranged in a running track of the robot, and strict construction standards are required to enable the identification code to be posted at a preset arrangement position, thereby ensuring that the running direction of the robot is not affected due to insufficient arrangement accuracy. Finally, after the layout of the identification code is completed, regular maintenance is required to avoid a situation that a pattern of the identification code is blurred due to aging or wearing, and cannot be recognized by the robot, which may result in unexpected running direction. It may be seen from the above that the cost is continuously increasing in a process of producing, arranging and maintaining the identification code, and since the process of producing, arranging and maintaining all depend on a working capacity of a corresponding executor, an error in any step in the process will seriously affect the accuracy of the operation of the robot, and even cause property loss.

In view of this, the present embodiment provides the method for controlling the motion of the robot. By collecting the moving scene image and analyzing the geometric line structure of the target reference object in the moving scene image, a process of adding the identification code is avoided, and cost of producing, arranging and maintaining the identification code is saved. Moreover, since an executive subject does not involve manual work, human error in implementation of the method for controlling the motion of the robot is effectively reduced, which helps to improve the accuracy of the operation of the robot.

FIG. 1A is a block diagram illustrating a target robot in a method for controlling motion of a robot according to an embodiment of the present disclosure.

In FIG. 1A, a visual image collecting component, an information processing component, a controlling component, a travelling component and an energy component are integrated in the target robot, where the energy component provides energy for the visual image collecting component, the information processing component, the controlling component and the travelling component, and the energy may be in a form of electrical energy, chemical energy, and the like, and a specific energy form is determined by an actual use scenario. The present embodiment is not limited thereto.

During execution of the method for controlling the motion of the robot, the visual image collecting component collects an image of an external operating environment, then transmits the collected image to the information processing component for processing, and calculates the moving direction of the target robot, a track direction of the moving track of the target robot and a motion adjustment parameter indicating that the target robot needs to adjust its moving direction according to the image of the external operating environment. The information processing component instructs the controlling component to adjust the moving direction of the target robot via the motion adjustment parameter, and the controlling component may be understood to be an apparatus for controlling the motion of the target robot, including a control chip, a control switch and the like. It should be noted that the apparatus for controlling the motion constituting the controlling component is determined by the actual use scenario, and the present embodiment is not limited thereto. The controlling component then controls the travelling component to implement the motion of the target robot, and the travelling component may be composed of one or a combination of parts such as a ratchet device, a gear mechanism, a power transmission shaft, a direction transmission shaft, a tire, a track and the like, and a specific combination thereof is determined by the actual use scenario. The present embodiment is not limited thereto.

Figure 1B:
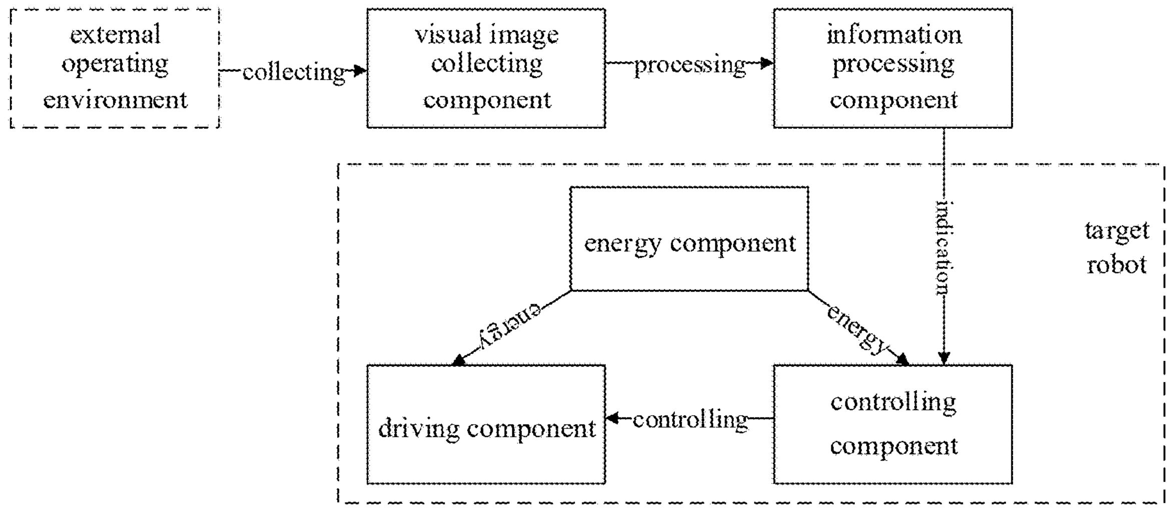
FIG. 1B is a block diagram illustrating a target robot in a method for controlling motion of a robot according to another embodiment of the present disclosure.

Moreover, FIG. 1B further shows a schematic structural diagram of another target robot, and compared with FIG. 1A, the visual image collecting component and the information processing component are not integrated in the target robot, and in this case, the visual image collecting component and the information processing component perform information interaction in a form of wired communication or wireless communication. It should be noted that FIG. 1B shows that neither the visual image collecting component nor the information processing component is integrated in the target robot. In addition, the visual image collecting component is integrated in the target robot, and the information processing component is not integrated in the target robot; alternatively, the visual image collecting component is not integrated in the target robot, and the information processing component is integrated in the target robot, where the information interaction is performed in a manner similar to that of an information interaction apparatus of each module in FIG. 1B, which will not be described in detail herein.

Figure 2:
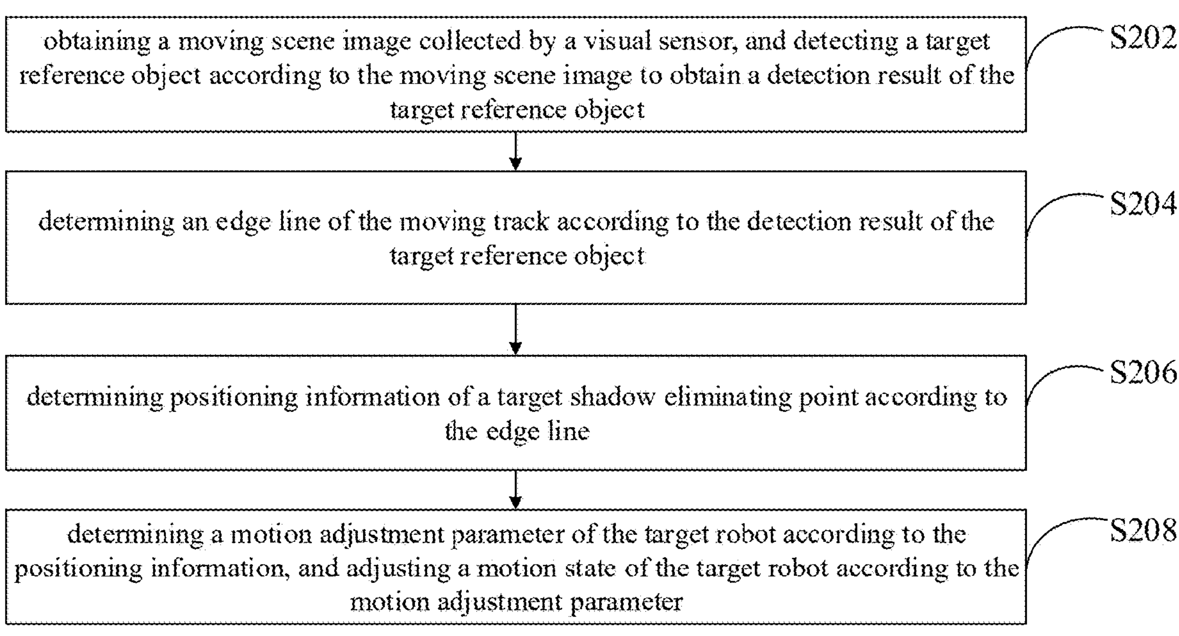
FIG. 2 is a flow chart of a method for controlling motion of a robot according to an embodiment of the present disclosure.

FIG. 2 is a flow chart of a method for controlling motion of a robot according to an embodiment of the present disclosure, which specifically includes the following steps.

In S202, a moving scene image collected by a visual sensor is obtained, and a target reference object is detected according to the moving scene image to obtain a detection result of the target reference object, where the target reference object includes reference objects at two sides of a moving track of a target robot.

Specifically, the present embodiment provides the method for controlling the motion of the robot. In the practical application, the method for controlling the motion of the robot provided in the present embodiment may be implemented in various scenarios, for example, it may be applied in an industrial site to enable a moving machine therein to move according to a preset motion trajectory; it may be applied to a warehousing site to enable a carrying robot therein to carry goods; it may be applied to a field of vehicle automatic driving to enable a vehicle to travel along a prescribed road in combination with an obstacle avoidance function. For ease of understanding, only the method for controlling the motion of the robot implemented at the warehousing site will be described below in the embodiments of the present disclosure.

In the actual use scenario, the visual sensor may be understood as a device such as a laser scanner and a digital camera, and the specific device used is determined by the actual use scenario and use needs, and the present embodiment is not limited thereto. The moving scene image may be understood as an image of an external environment where the target robot is located. The target reference object may be understood as a beam of a shelf on either side of a lane in a warehousing system, a road shoulder on either side of a road and the like. The specific target reference object may be arranged by a user according to the actual use needs, and the present embodiment is not limited thereto.

On this basis, the visual sensor collects the moving scene image of the external environment where the target robot is located during the motion process, and then scans and detects the moving scene image to determine a preset position of the target reference object therein. Moreover, the target reference object includes the reference objects at two sides of the moving track of the target robot during a running process of the target robot. For example, the target robot runs in a warehouse, and the collected moving scene image includes a row of shelves. In this case, the moving track of the target robot is a lane where the target robot is currently located, and the target reference object may be understood as a shelf adjacent to the lane.

Further, during collecting and processing of the image, there may be image noises including impulse noise, high-frequency noise and low-frequency noise. In a case where the collected image is directly processed, these noises will greatly affect processing quality. In order to solve this problem, the present disclosure provides the following specific implementation.

A noise-eliminated moving scene image is obtained by performing a filtering processing on the moving scene image.

The filtering processing includes filtering methods such as bilateral filtering and median filtering, and a specific filtering method used is determined by the actual use scenario, and the present embodiment is not limited thereto.

On this basis, the collected moving scene image is filtered, and the noise in the moving scene image is filtered to avoid influence of noise on a subsequent processing of the moving scene image.

For example, in the warehousing system, a loading robot carries goods along a designated lane, and a preset target reference is a warehouse shelf. During the movement of the loading robot, a visual sensor integrated on the loading robot collects an image in the lane where the loading robot is located at the moment, filters the collected image via performing bilateral filtering to obtain a moving scene image, and detects shelves at two sides of the lane where the loading robot is located in the moving scene image to obtain the detection result of the shelves at two sides of the lane.

In summary, with the above method, the noise in the collected moving scene image is removed, the accuracy for detecting the target reference object in the moving scene image is ensured, and the accuracy for adjusting a motion state of the target robot is further ensured.

Further, in a process of adjusting the moving direction of the target robot based on the moving scene image, a geometric line structural feature in the motion trajectory of the target robot is relied on, while the numerous visual features contained in the moving scene image do not help to adjust the moving direction of the target robot, and may form an interference item to affect a subsequent calculation process. In order to solve this problem, the present disclosure provides the following specific embodiments.

An edge line segment within a preset angle range is obtained by scanning the moving scene image, where the edge line segment represents an edge of the target reference object; and the detection result of the target reference object is obtained according to the edge line segment.

The preset angle may be understood as a preset angle range. In a case where a line segment in the moving scene image is not within the angle range, it may be considered to be an irrelevant line segment, and may be deleted or ignored. The edge line segment may be understood to be a line segment satisfying a preset angle requirement among the line segments corresponding to the edge of the target reference object in the moving scene image.

On this basis, the moving scene image is scanned, line segments corresponding to all the edges of the target reference object in the moving scene image are scanned, then it is determined whether angles of these line segments are within the preset angle range, the line segments which are not within this range are ignored, and the detection result of the target reference object is obtained according to the line segments which meet the angle range requirement.

Figure 3:
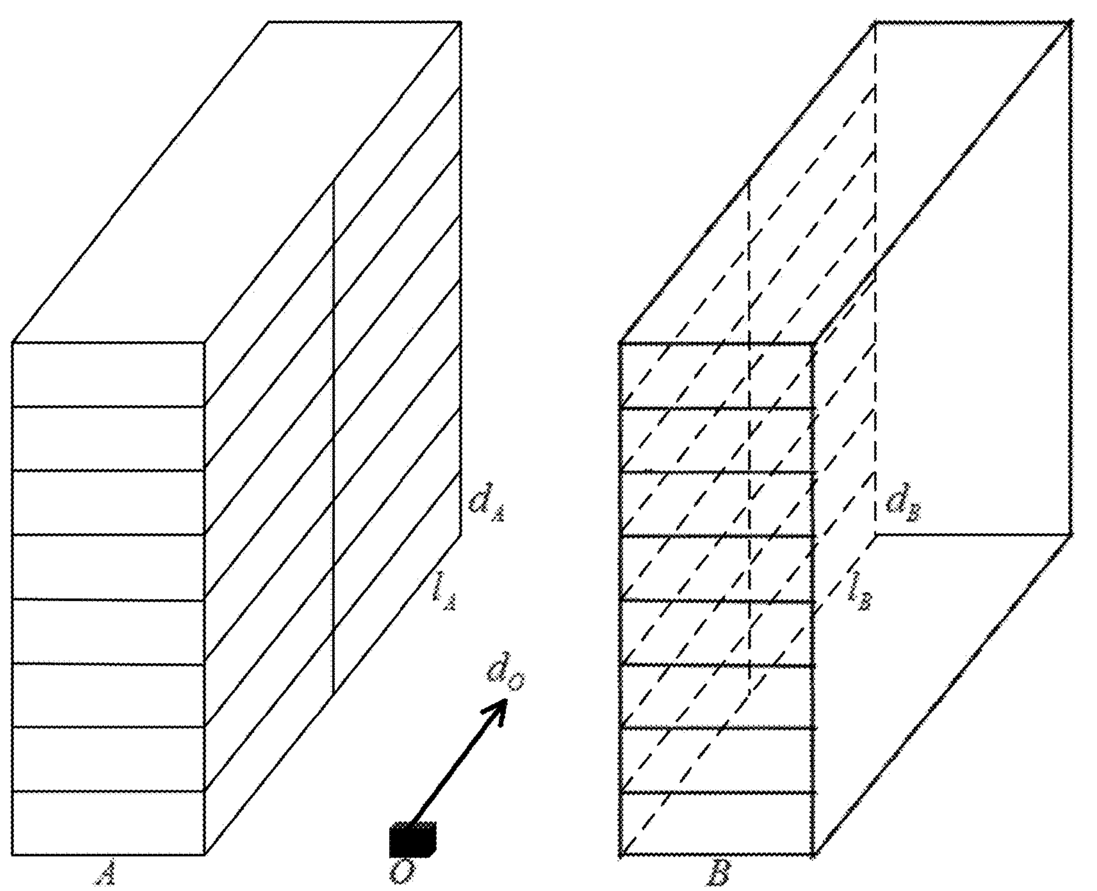
FIG. 3 is a schematic diagram illustrating a warehousing system where a method for controlling motion of a robot is implemented according to an embodiment of the present disclosure.

According to the above embodiment, after the moving scene image is filtered, the moving scene image is scanned to determine line segments corresponding to the edges of the shelves on both sides of the lane, and then, line segments corresponding to vertical beams in the shelf are deleted in this way to obtain edge line segments only including horizontal beams according to a preset angular range [0°, 90°)∪[90°, 180°), and a detection result of the shelf is obtained according to the obtained edge line segments. As shown in FIG. 3, the schematic diagram of the warehousing system where the method for controlling the motion of the robot is implemented, the loading robot is located at a point O, and corresponding line segments of vertical support beams of shelves A and B are removed after collecting an image by the loading robot, and only the line segments of the horizontal beams are retained.

Further, instead of determining the angle of the line segment corresponding to the edge of the shelf in the moving scene image, a horizontal operator which is only sensitive to the horizontal line segment may be directly used to collect the line segment of the edge of the shelf in the moving scene image. Since the horizontal operator is not sensitive to the vertical line segment, the vertical line segment will be ignored, thereby implementing a purpose of obtaining the detection result of the shelf.

In summary, a redundant visual feature in the moving scene image is removed in the above-mentioned manners. As illustrated in the example, an overall visual image of the shelf is split, only the edge line segments within the preset angle range are reserved, and thus data volume and interference items are greatly reduced, which is beneficial to improving the speed of subsequent processing and reducing consumption of the processing resource.

Further, in a case where the target reference object is a shelf, a process of determining the edge line segments within the preset angle range may further be implemented as follows in the present embodiment.

A beam boundary line segment of the shelf is obtained by scanning the shelf within the preset angle range in the moving scene image; and the detection result of the target reference object is obtained according to the beam boundary line segment.

In the shelf corresponding to the target reference object, the shelf satisfying the preset angle range is scanned. For example, a corner of the shelf in the warehouse is included in the moving scene image. In this case, it needs to determine the moving direction of the target robot before moving to the corner, and the preset angle range is used to select the shelf, and only the beam boundary line segment of the shelf in front of the corner is detected to obtain the detection result of the target reference object.

According to the above embodiment, in a case where the loading robot carries goods in the warehouse, the visual sensor integrated on the loading robot collects an image of the lane including the corner. At this moment, since the loading robot has not yet moved to the corner of the lane, only the shelf in front of the corner of the lane may be detected. A process of removing the shelf behind the corner of the lane and subsequently scanning and detecting the shelf before the corner of the lane according to the preset angle has been described in the above-mentioned steps of the present embodiment, and therefore the description will not be repeated here.

In summary, in this way, the target reference object in the moving scene image is filtered and selected, and thus adjustment of the motion state of the target robot is more accurate.

In S204, the edge line of the moving track is determined according to the detection result of the target reference object.

Specifically, after the target reference object is detected, since the target reference object exists on both sides of the moving track, it is possible to determine an edge of the moving track according to the detection result, thereby facilitating subsequent determination of the adjustment of the motion state of the target robot.

The edge line of the moving track may be understood as a line segment indicating the edge of the moving track of the target robot.

On this basis, according to the detection result obtained by detecting the target reference object, a straight line of the edge of the moving track of the target robot is determined, and a direction of the moving track may be determined based on the straight line, and the moving direction of the target robot may be further adjusted.

Further, in a case where there is more than one edge line segment in the target reference object, if subsequent processing is performed on the basis of these edge line segments, there will be various processing results obtained, resulting in confusion. In order to avoid confusion in the obtained processing results, the present disclosure provides the following specific implementation in the embodiments.

A length of each of multiple edge line segments is determined, and an edge line segment having a length lower than a preset length threshold is deleted to obtain a target scene image; a starting point position, an ending point position and a line segment direction of each of the multiple edge line segments in the target scene image are determined; each of the multiple edge line segments in the target scene image is fitted according to the starting point position, the ending point position and the line segment direction of each of the multiple edge line segments in the target scene image to obtain the edge line of the moving track.

The preset length threshold may be understood as a minimum length required by a specified length of the edge line segment, and an item which do not satisfy this length may be considered as an interference item, and is deleted or ignored during processing. It needs to be explained that a rule of "everything looks small in the distance and big on the contrary" exists in a scene where a three-dimensional image is projected onto a two-dimensional image, and a length of the object far away from the visual sensor will become shorter in the moving scene image, and thus a gradient length threshold is used, i.e., different length thresholds are arranged according to different regions of the moving scene image. For example, the visual sensor is close to the ground, at this moment, a length threshold of a bottom region of the moving scene image is set to 1 cm, and a length threshold of a top region of the moving scene image is set to 1 mm. The specific setting of the length threshold is determined by the actual use scenario, and the present embodiment is not limited thereto.

On this basis, the length of each of the multiple edge line segments is determined, and is compared with a corresponding preset length threshold, and the edge line segment having the length lower than the preset length threshold is deleted to obtain the target scene image. Next, a first reference direction and a second reference direction are set for the target scene image, end points of each of the multiple edge line segments in the target scene image are marked along the first reference direction, where a point located at a front end of the edge line segment is at a starting point position and a point located at the other end is at an ending point position. In a case where the edge line segment is parallel to the first reference direction, end points of the edge line segment parallel to the first reference direction are marked along the second reference direction, where a point located at a front end of the edge line segment is at a starting point position and a point located at the other end is at an ending point position.

Subsequently, a direction of the edge line segment is determined, two edge line segments whose direction range is less than the preset angle and whose distance between the starting position of one edge line segment and the ending position of the other edge line segment is less than the preset distance are selected, and the end points of the starting position and the ending position of the two edge line segments (the distance of the points is less than the preset distance) are fitted to obtain a new line segment. It needs to be explained that a straight line fitting technique may be used in a fitting process herein to process all the edge line segments in the target scene image as above to obtain the edge line of the moving track.

According to the above embodiment, in a case where a container is placed on the shelf in the warehouse, it is easy to take an edge of the container as a detection result in a detection process of the shelf. In this case, edge line segments shorter than a preset length are deleted to obtain the target scene image. Moreover, the shelf may not be placed tightly during a placement process, or there is some error in a placement angle of the shelf, and the placement of the shelf is not aligned. In this case, the starting position, the ending position and a direction of the line segment corresponding to an edge of a beam of the shelf in the target scene image are determined. The line segments (corresponding to the edge of the beam) having similar/same line segment directions and a relatively short distance between the end points are selected for straight line fitting. It should be noted that whether the line segment directions are similar/same and the distance between the end points is relatively short may be determined according to a preset direction threshold and a preset distance threshold. If it meets the thresholds, it is determined that the line segment directions are similar/same and the distance between the end points is relatively short. Finally, the edge line of the moving track may be obtained according to a result of the straight line fitting. The obtained edge line is the line segments corresponding to beams $\mathbf{1}_A$ and $\mathbf{1}_B$, and warehouse beams of warehouses A, B parallel with beams $\mathbf{1}_A$ and $\mathbf{1}_B$ shown in FIG. 3, the schematic diagram of the warehousing system where the method for controlling the motion of the robot is implemented.

In summary, with the above steps, it is possible to further remove the interference line segment in the collected image and fuse some edge line segments into one line segment, thereby reducing a number of line segments to be processed and further relieving computing stress.

In S206, positioning information of a target shadow eliminating point is determined according to the edge line.

Specifically, the edge of the moving track is determined after the edge line is determined, and the target shadow eliminating point and the positioning information of the target shadow eliminating point may be calculated according to this edge.

The target shadow eliminating point may be understood as an intersection point of straight lines of the edge lines of the moving track in a two-dimensional image, and the positioning information may be understood as information indicating a position of the target shadow eliminating point.

On this basis, the target shadow eliminating point and the positioning information including the position of the target shadow eliminating point are calculated according to the obtained edge line of the moving track of the target robot.

Further, in the actual use scenario, in order to calculate the direction of the moving track, such as the shelf in the warehousing system, the shadow eliminating point should be calculated according to beams of the same layers of the shelves at both sides of the moving track. However, since a beam of the shelf at a first layer and a beam of the shelf at a second layer are also parallel, a further shadow eliminating point may be obtained, but this shadow eliminating point may not correspond to the direction of the moving track. By regulating the adjustment of the motion state of the target robot with such a shadow eliminating point, the target robot may not follow an expected route. In order to solve this problem, the present disclosure provides the following specific embodiments.

An intersection point of extension lines of edge lines is determined as an initial shadow eliminating point; a number of extension lines intersected at the initial shadow eliminating point is counted for each initial shadow eliminating point; the target shadow eliminating point from the initial shadow eliminating point is determined according to the number of extension lines corresponding to each initial shadow eliminating point; and the positioning information of the target shadow eliminating point is determined.

The initial shadow eliminating point may be understood as a shadow eliminating point formed by an intersection point of straight lines of any edge lines, and the extension lines of the edge lines may be understood as a ray extending along the direction of the edge line starting from the end point of the edge line.

On this basis, the intersection point of the extension lines of the edge lines is determined, and the obtained intersection point is the initial shadow eliminating point. The number of the extension lines passing through each initial shadow eliminating point is determined, and the initial shadow eliminating point with a maximum number of the extension lines of the edge line passing through the initial shadow eliminating point is selected as the target shadow eliminating point. A position of the target shadow eliminating point is detected to obtain the positioning information of the target shadow eliminating point.

Further, determination of the target shadow eliminating point may further determine the intersection point of the straight line of every edge line, the obtained intersection point is the initial shadow eliminating point. The number of the straight lines of the edge lines passing through each initial shadow eliminating point is determined, and the initial shadow eliminating point with the maximum number is selected as the target shadow eliminating point.

According to the above embodiment, an RANSAC algorithm is used to calculate the target shadow eliminating point of the edge line of the shelf, and a specific calculation process is as follows. The intersection point in the two-dimensional image is obtained by arbitrarily selecting two edge lines from all the edge lines of the shelf to calculate cross multiplication, then the number of the edge lines of the shelf passing through the intersection point is calculated. The process is performed in cycle for N times, and the intersection point with a largest number of votes is obtained as the target shadow eliminating point, and the positioning information of the target shadow eliminating point is calculated to determine the positioning information. The obtained target shadow eliminating point is the intersection point of the straight lines of the beams $I_A$ and $I_B$ as shown in FIG. 3, the schematic diagram of the warehousing system where the method for controlling the motion of the robot is implemented.

In summary, with the above method, the target shadow eliminating point corresponding to two side edges of the moving track may be determined, and the track direction of the moving track may be determined according to the target shadow eliminating point.

In S208, the motion adjustment parameter of the target robot is determined according to the positioning information, and the motion state of the target robot is adjusted according to the motion adjustment parameter.

Specifically, after determining the target shadow eliminating point corresponding to the moving track of the target robot, the track direction of the moving track may be further determined, and the moving direction of the target robot may be adjusted based on this track direction, so that the target robot moves along the moving track.

The motion adjustment parameter may be understood to be a parameter for adjusting the moving direction of the target robot. The motion state may be understood as a motion mode adopted by the target robot, such as firstly rotating by a certain angle and then performing linear movement; or an oblique line movement that enables an orientation of the target robot to be not changed, but is performed at a certain angle with an orientation direction via an universal wheel at bottom of the target robot; or a curved motion with a certain number of radians. It should be noted that the motion mode of the target robot indicated by the motion state is determined by the actual use scene, and the present embodiment is not limited thereto.

On this basis, after determining the target shadow eliminating point corresponding to the moving track of the target robot, the motion adjustment parameter, which the target robot needs to comply with in a subsequent motion process, is calculated according to the positioning information of the target shadow eliminating point, and finally the motion state of the target robot is adjusted according to the motion adjustment parameter.

Further, the target robot needs to move in the moving track. In a case where the motion state of the target robot is adjusted, ignoring a direction of the moving track would lead the target robot to depart from constraint of the moving track. In order to avoid this situation, the present disclosure provides the following specific implementation.

The track direction of the moving track is determined according to the positioning information, and the motion adjustment parameter of the target robot is determined according to the track direction.

The track direction may be understood as a vector indicative of the motion track calculated from the positioning information, and this vector is more likely to be a unit vector in the actual use scenario, i.e. it is used to indicate the direction not the size.

On this basis, the direction of the moving track is calculated according to the positioning information of the target shadow eliminating point, and after the direction of the moving track is obtained, the motion adjustment parameter for adjusting the moving direction in the subsequent movement process of the target robot is further determined.

In summary, in the above manner, it is ensured that the target robot will be constrained by the moving track, so that the target robot will not depart from a scope of the moving track during the movement.

Further, in a process of calculating the direction of the moving track, since an angle at which the visual sensor collects an image is different, the track direction of the moving track determined according to the collected image is different. In order to standardize the track direction, the present disclosure provides the following specific implementation.

A target internal reference matrix of the visual sensor is obtained, and the track direction of the moving track is calculated according to the positioning information and the target internal reference matrix.

The target internal reference matrix may be understood as a characteristic parameter configured by the visual sensor.

On this basis, the characteristic parameter configured by the visual sensor, i.e. the target internal reference matrix, are read, and the track direction of the moving track is calculated by the target internal reference matrix in combination with the positioning information of the target shadow eliminating point.

In summary, through the characteristic parameter configured by the visual sensor, a collecting angle that the visual sensor collects the moving scene image may be determined, and the track direction is determined by the collecting angle to standardize the determination of the track direction.

Further, determining the adjustment of the moving direction of the target robot needs to be performed in combination with an original moving direction of the target robot. The present disclosure provides the following specific implementation.

The moving direction of the target robot is determined according to the moving scene image, and the motion adjustment parameter of the target robot is calculated according to the moving direction and the track direction.

In a process of determining the moving direction of the target robot, there are two cases, the first one is that the visual sensor is integrated on the target robot, and the second one is that the visual sensor is not integrated on the target robot. In the first case, if the visual sensor is fixed on the target robot and is not movable, an angle between a shooting angle of a data sensor and the moving direction of the target robot is fixed. In this case, the moving direction of the target robot is taken as an initial direction, i.e. taking its corresponding vector in a three-dimensional space as an origin vector. In the second case, the visual sensor may determine a fixed part on the target robot as a reference point by scanning the target robot, and then further determine a pointing direction of the target robot as a moving direction of the target robot.

With the determined moving direction of the target robot, a parameter for the adjustment of the moving direction required by the target robot is calculated according to the moving direction and the track direction, and this parameter is the motion adjustment parameter.

According to the above embodiment, a target internal reference matrix K of the visual sensor is read, and a normalized direction vector $d_s$ of a moving track in a visual sensor coordinate system is calculated according to the obtained positioning information $V_s$ by the following Equation 1.

$$d_s = \frac{K^{-1}V_s}{\|K^{-1}V_s\|} \quad \text{Equation 1}$$

Then, a moving direction do of the loading robot is determined according to an integrated relationship between a target sensor and the loading robot, as shown in the schematic diagram of the warehousing system where the method for controlling the motion of the robot is implemented of FIG. 3. After that, a rotation angle R of the loading robot with respect to the track direction of the moving track is calculated by the following Equation 2.

$$d_o = Rd_s \quad \text{Equation 2}$$

Finally, the loading robot continues to move after rotating for the rotation angle R.

In summary, through the above-mentioned steps, the moving direction of the target robot is modified so that it may move along the direction of the moving track, and the constraint on the moving track of the target robot is implemented.

In the embodiments of the present disclosure, the motion state of the target robot is able to be adjusted in real time by detecting the target reference object in the moving scene image, determining the edge line of the moving track of the target robot according to the detection result, calculating the target shadow eliminating point according to the edge line, and adjusting the motion state of the target robot according to the motion adjustment parameter calculated by the target shadow eliminating point. The implementation process only depends on existing geometric line structural features in the moving track of the target robot, without adding additional reference objects, thereby ensuring flexibility, accuracy and cost controllability of the adjustment of the motion state of the target robot.

Figure 4:
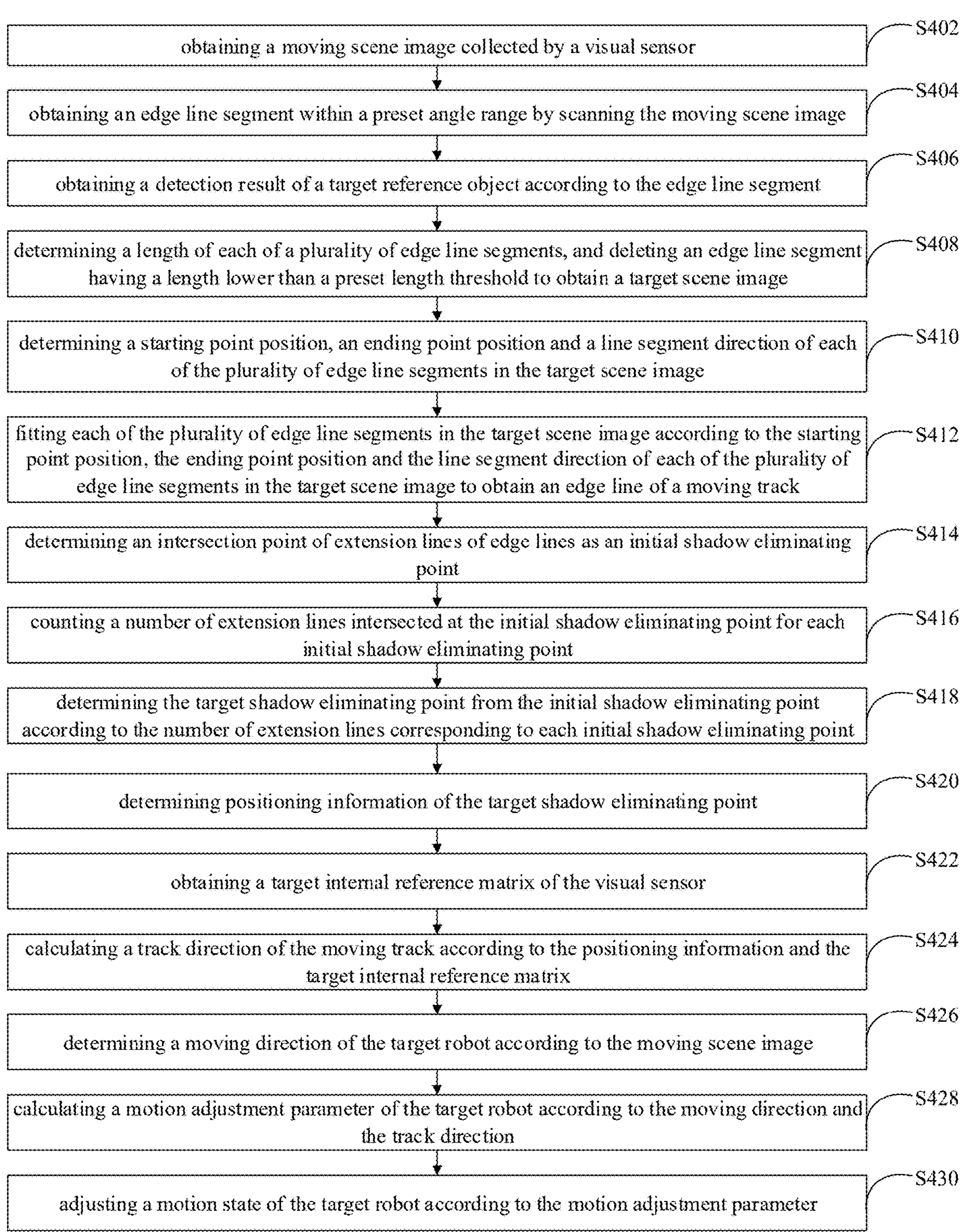
FIG. 4 is a flow chart of a processing procedure of a method for controlling motion of a robot according to an embodiment of the present disclosure.

In the following, with reference to FIG. 4, application of the method for controlling the motion of the robot provided in the present disclosure in automatic driving is taken as an example, the method for controlling the motion of the robot will be further explained. FIG. 4 is a flow chart of a processing procedure of a method for controlling motion of a robot according to an embodiment of the present disclosure, including the following steps.

In S402, the moving scene image collected by the visual sensor is obtained.

Specifically, a road image is collected according to a visual sensor integrated in an automatic driving automobile, and the road image is median-filtered to obtain the moving scene image.

In S404, the edge line segment within the preset angle range is obtained by scanning the moving scene image.

Specifically, the moving scene image is scanned, edge line segments of road shoulder(s) as the target reference object in the image is collected, and line segments in a vertical angle are filtered from the collected edge line segments of the road shoulder(s).

In S406, the detection result of the target reference object is obtained according to the edge line segment.

In S408, the length of each of the multiple edge line segments is determined, and the edge line segment having the length lower than the preset length threshold is deleted to obtain the target scene image.

Specifically, in the collected image including an edge of the road shoulder, the line segments less than 1 meter are deleted to obtain the target scene image.

In S410, the starting point position, the ending point position and the line segment direction of each of the multiple edge line segments in the target scene image are determined.

Specifically, a starting point position, an ending point position, and a respective road shoulder direction of each road shoulder line segment in the target scene image are determined.

In S412, each of the multiple edge line segments in the target scene image is fitted according to the starting point position, the ending point position and the line segment direction of each of the multiple edge line segments in the target scene image to obtain the edge line of the moving track.

Specifically, each road shoulder line segment is fitted in the straight line according to the determined starting point position, ending point position and road shoulder direction of the road shoulder line segment to obtain the edge line.

In S414, the intersection point of the extension lines of the edge lines is determined as the initial shadow eliminating point.

In S416, the number of extension lines intersected at the initial shadow eliminating point is counted for each initial shadow eliminating point.

In S418, the target shadow eliminating point is determined from the initial shadow eliminating point according to the number of extension lines corresponding to each initial shadow eliminating point.

Specifically, three shadow eliminating points are obtained, and the initial shadow eliminating point with a maximum number of edge lines passing through the shadow eliminating point is determined as the target shadow eliminating point.

In S420, the positioning information of the target shadow eliminating point is determined.

Specifically, the positioning information of the target shadow eliminating point is determined.

In S422, the target internal reference matrix of the visual sensor is obtained.

Specifically, an internal reference matrix of the visual sensor on an autonomous vehicle is obtained.

In S424, the track direction of the moving track is calculated according to the positioning information and the target internal reference matrix.

Specifically, a direction of the road is calculated according to the obtained internal reference matrix and the positioning information of the target shadow eliminating point.

In S426, the moving direction of the target robot is determined according to the moving scene image.

Specifically, since the visual sensor is provided in the autonomous vehicle, a direction of an origin in the three-dimensional space is used as a moving direction of the autonomous vehicle.

In S428, the motion adjustment parameter of the target robot is calculated according to the moving direction and the track direction.

Specifically, an angle which an automobile needs to rotate is determined according to a moving direction of the automobile and the direction of the road.

In S430, the motion state of the target robot is adjusted according to the motion adjustment parameter.

Specifically, the moving direction of the automobile is adjusted according to the obtained steering angle.

In the embodiments of the present disclosure, the motion state of the target robot is able to be adjusted in real time by detecting the target reference object in the moving scene image, determining the edge line of the moving track of the target robot according to the detection result, calculating the target shadow eliminating point according to the edge line, and adjusting the motion state of the target robot according to the motion adjustment parameter calculated by the target shadow eliminating point. The implementation process only depends on existing geometric line structural features in the moving track of the target robot, without adding additional reference objects, thereby ensuring flexibility, accuracy and cost controllability of the adjustment of the motion state of the target robot.

Figure 5:
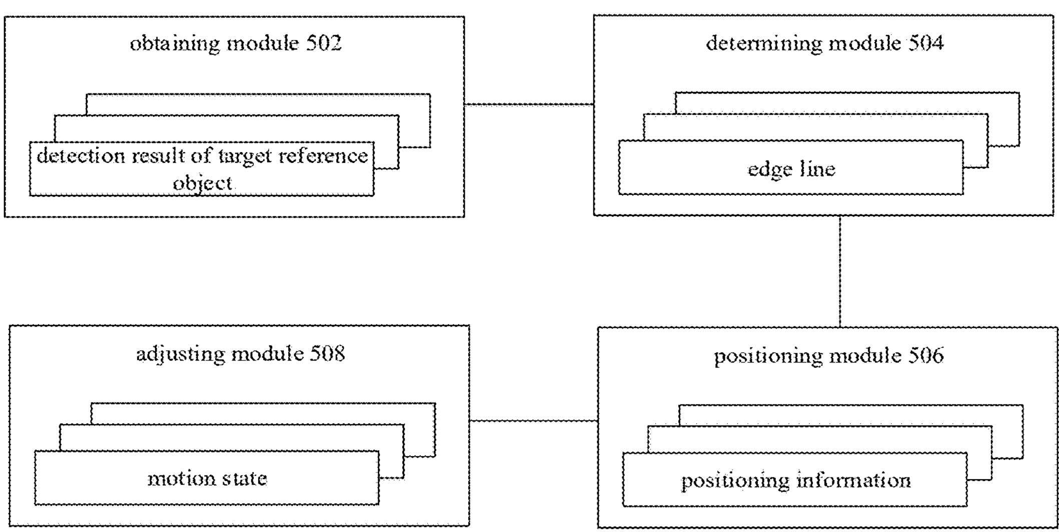
FIG. 5 is a schematic structural diagram illustrating an apparatus for controlling motion of a robot according to an embodiment of the present disclosure.

Corresponding to the above-mentioned method embodiments, the present disclosure further provides an apparatus embodiment for controlling the motion of the robot, and FIG. 5 is a schematic structural diagram illustrating an apparatus for controlling motion of a robot according to an embodiment of the present disclosure. As shown in FIG. 5, the apparatus includes: an obtaining module 502 configured to obtain a moving scene image collected by a visual sensor, and detect a target reference object according to the moving scene image to obtain a detection result of the target reference object, where the target reference object includes reference objects at two sides of a moving track of a target robot; a determining module 504 configured to determine an edge line of the moving track according to the detection result of the target reference object; a positioning module 506 configured to determine positioning information of a target shadow eliminating point according to the edge line; and an adjusting module 508 configured to determine a motion adjustment parameter of the target robot according to the positioning information, and adjust a motion state of the target robot according to the motion adjustment parameter.

In an embodiment, the obtaining module 502 is further configured to: obtain an edge line segment within a preset angle range by scanning the moving scene image, where the edge line segment represents an edge of the target reference object; and obtain the detection result of the target reference object according to the edge line segment.

In an embodiment, the obtaining module 502 is further configured to: obtain a beam boundary line segment of the shelf by scanning the shelf within the preset angle range in the moving scene image; and obtain the detection result of the target reference object according to the beam boundary line segment.

In an embodiment, the determining module 504 is further configured to: determine a length of each of the plurality of edge line segments, and delete an edge line segment having a length lower than a preset length threshold to obtain a target scene image; determine a starting point position, an ending point position and a line segment direction of each of the plurality of edge line segments in the target scene image; fit each of the plurality of edge line segments in the target scene image according to the starting point position, the ending point position and the line segment direction of each of the plurality of edge line segments in the target scene image to obtain the edge line of the moving track.

In an embodiment, the positioning module 506 is further configured to: determine an intersection point of extension lines of edge lines as an initial shadow eliminating point; count a number of extension lines intersected at the initial shadow eliminating point for each initial shadow eliminating point; determine the target shadow eliminating point from the initial shadow eliminating point according to the number of extension lines corresponding to each initial shadow eliminating point; and determine the positioning information of the target shadow eliminating point.

In an embodiment, the adjusting module 508 is further configured to: determine a track direction of the moving track according to the positioning information; and determine the motion adjustment parameter of the target robot according to the track direction.

In an embodiment, the adjusting module 508 is further configured to: obtain a target internal reference matrix of the visual sensor; and calculate the track direction of the moving track according to the positioning information and the target internal reference matrix.

In an embodiment, the adjusting module 508 is further configured to: determine a moving direction of the target robot according to the moving scene image; and calculate the motion adjustment parameter of the target robot according to the moving direction and the track direction.

In an embodiment, the apparatus for controlling the motion of the robot further includes: a filtering module configured to obtain a noise-eliminated moving scene image by performing a filtering processing on the moving scene image.

The apparatus for controlling the motion of the robot provided in the embodiments of the present disclosure may execute the method for controlling the motion of the robot provided in the embodiments of the present disclosure to adjust the motion state of the target robot in real time. The implementation process only depends on the existing geometric line structural features in the moving track of the target robot, without adding the additional reference objects, thereby ensuring the flexibility, accuracy and cost controllability of adjustment of the motion state of the target robot.

The foregoing embodiment provides an illustrative solution of the apparatus for controlling the motion of the robot of the present disclosure. It should be noted that the technical solution of the apparatus for controlling the motion of the robot and the technical solution of the above-mentioned method for controlling the motion of the robot fall within the same concept. Moreover, for the details not described in detail in the technical solution of the apparatus for controlling the motion of the robot, reference may be made to the description of the technical solution of the above-mentioned method for controlling the motion of the robot.

Figure 6:
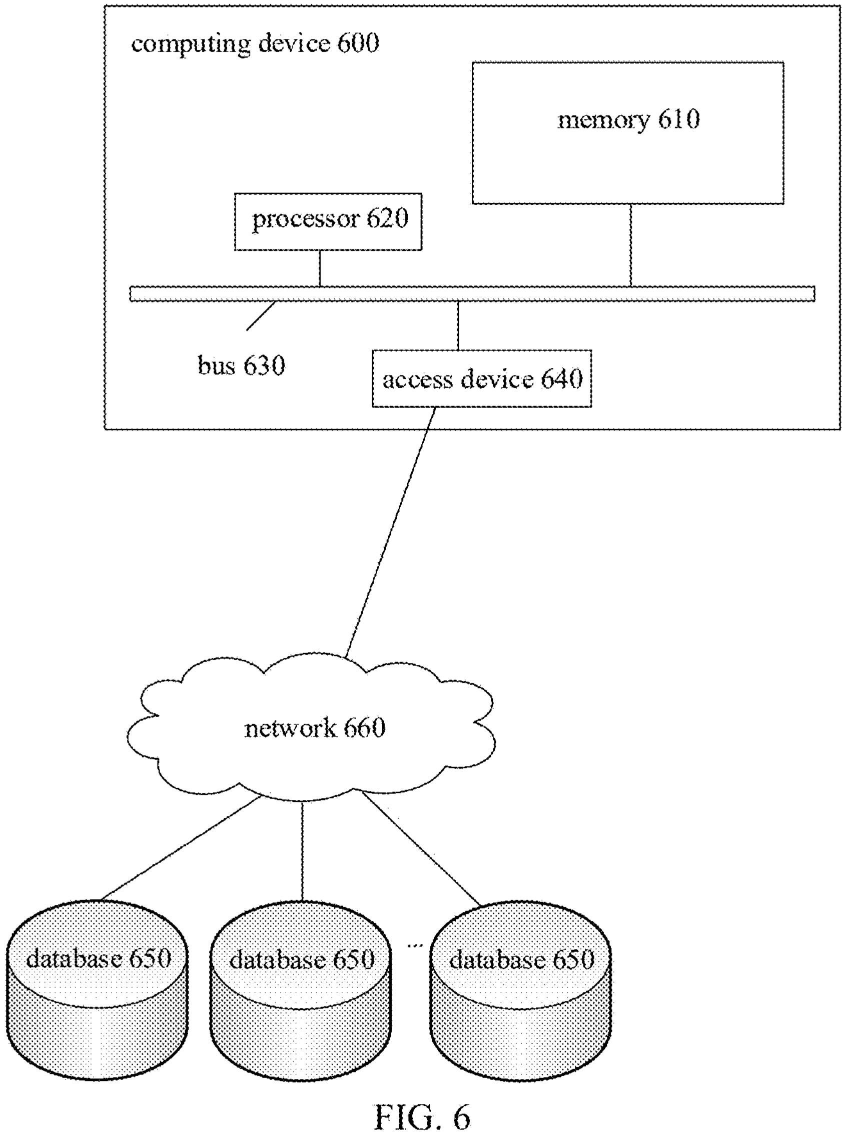
FIG. 6 is a block diagram of a computing device according to an embodiment of the present disclosure.

FIG. 6 is a block diagram of a computing device 600 according to an embodiment of the present disclosure. Components of the computing device 600 include, but are not limited to, a memory 610 and a processor 620. The processor 620 is coupled to the memory 610 via a bus 630, and a database 650 is configured to store data.

The computing device 600 further includes an access device 640 that enables computing device 600 to communicate via one or more networks 660. Examples of such networks include a public switched telephone network (PSTN), a local area network (LAN), a wide area network (WAN), a personal area network (PAN), or a combination of communication networks such as Internet. The access device 640 may include one or more of any type of network interface, wired or wireless (e.g. a network interface card (NIC)), such as a IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In an embodiment of the present disclosure, the aforementioned components of the computing device 600, as well as other components not shown in FIG. 6, may also be connected to each other, such as via the bus. It should be understood that the block diagram of the computing device shown in FIG. 6 is for exemplary purposes only and is not intended to limit the scope of the present disclosure. Other components may be added or substituted as needed by those skilled in the art.

The computing device 600 may be any type of stationary or mobile computing device, including mobile computers or mobile computing devices (e.g. tablet computers, personal digital assistants, laptop computers, notebook computers, netbooks, etc.), mobile telephones (e.g. smartphones), wearable computing devices (e.g. smart watches, smart glasses, etc.) or other types of mobile devices, or stationary computing devices such as desktop computers or PCs. The computing device 600 may also be a mobile or stationary server.

The processor 620 is configured to execute computer-executable instructions that, when executed by the processor, implement the steps of the method for controlling the motion of the robot described above.

The foregoing is an illustrative solution of the computing device of the present embodiment. It should be noted that the technical solution of the computing device and the technical solution of the above-mentioned method for controlling the motion of the robot fall within the same concept. Moreover, for the details not described in detail in the technical solution of the computing device, reference may be made to the description of the technical solution of the above-mentioned method for controlling the motion of the robot.

An embodiment of the present disclosure further provides a computer-readable storage medium storing computer-executable instructions that, when executed by a processor, execute steps of the method for controlling the motion of the robot described above.

The foregoing is an illustrative solution of the computer-readable storage medium of the present embodiment. It should be noted that the technical solution of the computer-readable storage medium and the technical solution of the above-mentioned method for controlling the motion of the robot fall within the same concept. Moreover, for the details not described in detail in the technical solution of the computer-readable storage medium, reference may be made to the description of the technical solution of the above-mentioned method for controlling the motion of the robot.

An embodiment of the present disclosure further provides a computer program that, when executed in a computer, enables the computer to perform steps of the method for controlling the motion of the robot described above.

The foregoing is an illustrative solution of the computer program of the present embodiment. It should be noted that the technical solution of the computer program and the technical solution of the above-mentioned method for controlling the motion of the robot fall within the same concept. Moreover, for the details not described in detail in the technical solution of the computer-readable storage medium, reference may be made to the description of the technical solution of the above-mentioned method for controlling the motion of the robot.

The foregoing description of specific embodiment of the present disclosure has been presented. Other embodiments are within the scope of the following claims. In some cases, acts or steps recited in the claims may be executed out of the order in embodiments and still achieve desirable results. Moreover, the processes depicted in the figures do not necessarily require the particular order shown, or sequential order, to achieve desired results. Multi-tasking and parallel processing are also possible or may be advantageous in some embodiments.

The computer instruction includes computer program code, which may be in the form of source code, object code, an executable file or some intermediate form, etc. The computer-readable medium may include: any entity or device, recording medium, U-disk, removable hard disk, magnetic disk, optical disk, computer memory, read-only memory (ROM), random access memory (RAM), electrical carrier wave signal, telecommunications signal, software distribution medium, or the like, capable of carrying the computer program code. It should be noted that the computer-readable medium may include content which is subject to appropriate additions and subtractions as required by legislation and patent practice in jurisdictions such as, in some jurisdictions, where the computer-readable medium does not include electrical carrier wave signals and telecommunication signals in accordance with legislation and patent practice.

It should be noted that each of the foregoing method embodiments is presented as a series of combinations of acts for ease of description, but those skilled in the art will recognize that embodiments of the present disclosure are not limited by the order of acts described, as some steps may occur in other orders or concurrently with other acts from embodiments of the present disclosure. Furthermore, those skilled in the art shall further appreciate that embodiments of the present disclosure are presently considered to be preferred, and that the acts and modules involved are not necessarily required by embodiments described herein.

In above embodiments, descriptions of respective embodiments are emphasized differently, and parts that are not detailed in some embodiments may refer to relevant descriptions of other embodiments.

The preferred embodiments of the present disclosure disclosed above are intended to be illustrative only. Alternative embodiments are not exhaustive and do not limit the present disclosure to the particular embodiments described. Many modifications and variations are possible in light of the above teachings. Embodiments were chosen and described in detail in order to best explain principles of embodiments and their practical application to thereby enable those skilled in the art to best understand and utilize the present disclosure. It is intended that the present disclosure is limited only by the claims and the full scope and equivalents thereof.

What is claimed is:

1. A method for controlling motion of a robot, comprising:

obtaining a moving scene image collected by a visual sensor, and detecting a target reference object according to the moving scene image to obtain a detection result of the target reference object, wherein the target reference object comprises reference objects at two sides of a moving track of a target robot;

determining an edge line of the moving track according to the detection result of the target reference object;

determining positioning information of a target shadow eliminating point according to the edge line; and determining a motion adjustment parameter of the target robot according to the positioning information, and adjusting a motion state of the target robot according to the motion adjustment parameter;

wherein the detection result of the target reference object comprises a plurality of edge line segments; and determining the edge line of the moving track according to the detection result of the target reference object comprises:

determining a length of each of the plurality of edge line segments, and deleting an edge line segment having a length lower than a preset length threshold to obtain a target scene image;

determining a starting point position, an ending point position and a line segment direction of each of the plurality of edge line segments in the target scene image; and fitting each of the plurality of edge line segments in the target scene image according to the starting point position, the ending point position and the line segment direction of each of the plurality of edge line segments in the target scene image to obtain the edge line of the moving track.

2. The method of claim 1, wherein detecting the target reference object according to the moving scene image to obtain the detection result of the target reference object comprises:

obtaining an edge line segment within a preset angle range by scanning the moving scene image, wherein the edge line segment represents an edge of the target reference object; and obtaining the detection result of the target reference object according to the edge line segment.

3. The method of claim 2, wherein the target reference object is a shelf; and obtaining the edge line segment within the preset angle range by scanning the moving scene image comprises:

obtaining a beam boundary line segment of the shelf by scanning the shelf within the preset angle range in the moving scene image; and obtaining the detection result of the target reference object according to the beam boundary line segment.

4. The method of claim 1, wherein determining the positioning information of the target shadow eliminating point according to the edge line comprises:

determining an intersection point of extension lines of edge lines as an initial shadow eliminating point;

counting a number of extension lines intersected at the initial shadow eliminating point for each initial shadow eliminating point;

determining the target shadow eliminating point from the initial shadow eliminating point according to the number of extension lines corresponding to each initial shadow eliminating point; and determining the positioning information of the target shadow eliminating point.

5. The method of claim 1, wherein determining the motion adjustment parameter of the target robot according to the positioning information comprises:

determining a track direction of the moving track according to the positioning information; and determining the motion adjustment parameter of the target robot according to the track direction.

6. The method of claim 5, wherein determining the track direction of the moving track according to the positioning information comprises:

obtaining a target internal reference matrix of the visual sensor; and calculating the track direction of the moving track according to the positioning information and the target internal reference matrix.

7. The method of claim 5, wherein determining the motion adjustment parameter of the target robot according to the track direction comprises:

determining a moving direction of the target robot according to the moving scene image; and calculating the motion adjustment parameter of the target robot according to the moving direction and the track direction.

8. The method of claim 1, wherein before detecting the target reference object according to the moving scene image to obtain the detection result of the target reference object, the method further comprises:

obtaining a noise-eliminated moving scene image by performing a filtering processing on the moving scene image.

9. A computing device, comprising:

a memory, and a processor;

wherein the memory is configured to store computer-executable instructions, and the processor is configured to execute the computer-executable instructions to:

obtain a moving scene image collected by a visual sensor, and detecting a target reference object according to the moving scene image to obtain a detection result of the target reference object, wherein the target reference object comprises reference objects at two sides of a moving track of a target robot;

determine an edge line of the moving track according to the detection result of the target reference object;

determine positioning information of a target shadow eliminating point according to the edge line; and determine a motion adjustment parameter of the target robot according to the positioning information, and adjust a motion state of the target robot according to the motion adjustment parameter;

wherein the detection result of the target reference object comprises a plurality of edge line segments; and the processor is further configured to:

determine a length of each of the plurality of edge line segments, and deleting an edge line segment having a length lower than a preset length threshold to obtain a target scene image;

determine a starting point position, an ending point position and a line segment direction of each of the plurality of edge line segments in the target scene image; and fit each of the plurality of edge line segments in the target scene image according to the starting point position, the ending point position and the line segment direction of each of the plurality of edge line segments in the target scene image to obtain the edge line of the moving track.

10. The computing device of claim 9, wherein the processor is further configured to:

obtain an edge line segment within a preset angle range by scanning the moving scene image, wherein the edge line segment represents an edge of the target reference object; and obtain the detection result of the target reference object according to the edge line segment.

11. The computing device of claim 10, wherein the target reference object is a shelf; and the processor is further configured to:

obtain a beam boundary line segment of the shelf by scanning the shelf within the preset angle range in the moving scene image; and obtain the detection result of the target reference object according to the beam boundary line segment.

12. The computing device of claim 9, wherein the processor is further configured to:

determine an intersection point of extension lines of edge lines as an initial shadow eliminating point;

count a number of extension lines intersected at the initial shadow eliminating point for each initial shadow eliminating point;

determine the target shadow eliminating point from the initial shadow eliminating point according to the number of extension lines corresponding to each initial shadow eliminating point; and determine the positioning information of the target shadow eliminating point.

13. The computing device of claim 9, wherein the processor is further configured to:

determine a track direction of the moving track according to the positioning information; and determine the motion adjustment parameter of the target robot according to the track direction.

14. The computing device of claim 13, wherein the processor is further configured to:

obtain a target internal reference matrix of the visual sensor; and calculate the track direction of the moving track according to the positioning information and the target internal reference matrix.

15. The computing device of claim 13, wherein the processor is further configured to:

determine a moving direction of the target robot according to the moving scene image; and calculate the motion adjustment parameter of the target robot according to the moving direction and the track direction.

16. The computing device of claim 9, wherein before detecting the target reference object according to the moving scene image to obtain the detection result of the target reference object, the processor is further configured to:

obtain a noise-eliminated moving scene image by performing a filtering processing on the moving scene image.

17. A non-transitory computer-readable storage medium storing computer-executable instructions that, when executed by a processor, causes the processor to:

obtain a moving scene image collected by a visual sensor, and detecting a target reference object according to the moving scene image to obtain a detection result of the target reference object, wherein the target reference object comprises reference objects at two sides of a moving track of a target robot;

determine an edge line of the moving track according to the detection result of the target reference object;

determine positioning information of a target shadow eliminating point according to the edge line; and determine a motion adjustment parameter of the target robot according to the positioning information, and adjust a motion state of the target robot according to the motion adjustment parameter;

wherein the detection result of the target reference object comprises a plurality of edge line segments; and the instructions, when executed, further cause the processor to:

determine a length of each of the plurality of edge line segments, and deleting an edge line segment having a length lower than a preset length threshold to obtain a target scene image;

determine a starting point position, an ending point position and a line segment direction of each of the plurality of edge line segments in the target scene image; and fit each of the plurality of edge line segments in the target scene image according to the starting point position, the ending point position and the line segment direction of each of the plurality of edge line segments in the target scene image to obtain the edge line of the moving track.

18. The non-transitory computer-readable storage medium of claim 17, wherein the processor is further configured to:

obtain an edge line segment within a preset angle range by scanning the moving scene image, wherein the edge line segment represents an edge of the target reference object; and obtain the detection result of the target reference object according to the edge line segment.

* * * * *